Figure 1:
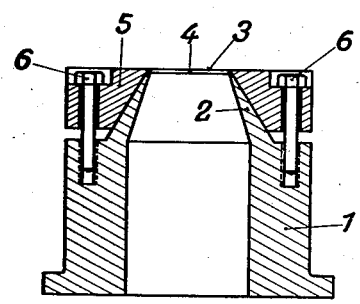

Dec. 8, 1936.                D. VON MIHÁLY                2,063,277
SLIT FORMING DEVICE FOR RECORDING OR REPRODUCING PHOTOGRAPHIC SOUND RECORDS
                    Filed March 21, 1935

Inventor:
Dénes von Mihály
By Bailey & Carson
Attorneys

Patented Dec. 8, 1936

2,063,277

UNITED STATES PATENT OFFICE 2,063,277

SLIT FORMING DEVICE FOR RECORD-
ING OR REPRODUCING PHOTOGRAPHIC
SOUND RECORDS

Dénes von Mihály, Berlin-Wilmersdorf, Germany

Application March 21, 1935, Serial No. 12,327
In Germany July 5, 1934

4 Claims. (Cl. 179—100.31)

My invention relates to a device forming a slit to be traversed by a light beam for recording sound on or reproducing from a film.

Such slit forming devices usually consist of two blades which are shiftable in guides to enable one to adjust their distance to the desired measure of about 0.02 mm. It is obvious that such a device is very expensive because of the necessary high position in manufacturing it; moreover it has the disadvantage that, owing to the necessary guides for the blades it can not be arranged in the desired close proximity to the film since the perforated and in consequence of the perforation slightly raised part of the film would come into direct contact with the side parts of the device. Such devices cause particular difficulties when employed for recording sound or reproducing from a film having a plurality of parallel sound tracks as in this case another slit for selecting the single sound tracks is necessary, and this second slit must necessarily be arranged in a plane different from the plane of the sound selecting slit, that is, in greater distance from the film, whereby a considerable light diffraction impairing the quality of the record as well as of the reproduction is caused.

The object of this invention is to provide a slit forming device which is inexpensive in manufacturing and can be arranged in close proximity to the film even next to the perforated parts thereof.

Another object of the invention is to provide a slit forming device adapted for suitably limiting the recording or reproducing light beam in the lengthwise direction of the sound track and in the transversal direction thereof in the same plane being in close proximity to the film.

A further object of my invention is a method for producing the aforesaid slit forming device.

In the drawing an embodiment of the invention is shown by way of example.

Figure 2:
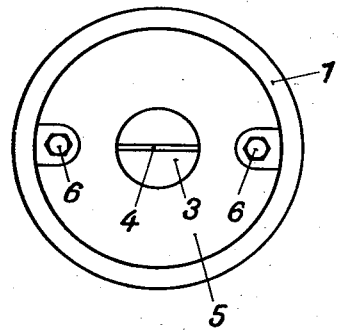

Referring to the drawing, Fig. 1 is a sectional view of the device, and Fig. 2 is a plane view thereof.

The circular frontal area 3 of the pointed end 2 of the hollow body of rotation 1 is provided with a slit 4. As it is not possible to directly produce a slit of 0.02 mm. width, the slit is narrowed by a squeezing cone 5 pressed upon the end portion 2 by means of the screws 6. In case that this device should be used for recording sound on or reproducing from a film having a plurality of parallel sound tracks, the diameter of the frontal area 3 is preferably made equal to the width of one of these sound tracks so that any slit fully traversing this area will have a length being equal to the width of the sound tracks, thus limiting the recording or reproducing light beam to any of said tracks.

The described slit forming device can be made out of a body of rotation 1 by pointing one of its ends conically until the desired diameter of its frontal area is obtained, and then boring it out until the point of the drill will appear in the center of the frontal area 3. It is advantageous to use a drill having a conical end, the angle of this cone being slightly higher than the angle of the cone of the pointed end 2 of the body 1, so that after completing the boring the inner diameter of the pointed end 2 next to the front part 3 be but slightly smaller than the diameter of the frontal area 3. Now the remaining thin frontal part of the body is slotted by means of a fine slot-cutter of a width of about 0.1 mm. Then a gange of mica or other suitable material having a thickness of 0.02 mm. is put into the slit, and the slit is squeezed by the cone 5 until it will tightly enclose the gange.

Naturally instead of the described cylindrical body a hollow body of any convenient form may be used, and the pointed end of it can be flattened instead of being conical.

Having now particularly described and ascertained the nature of my invention and in what manner the same is to be performed I declare that what I claim is:

1. A slit forming device for recording or reproducing photographic records comprising a hollow body having one of its ends pointed, said body having a slit in the frontal area of the pointed end thereof, and a squeezing body having sloping internal walls and means to move said squeezing body in a direction transverse to the frontal area of the hollow body and exert inward pressure on the sides of the pointed end of said body.

2. Device according to claim 1 for recording or reproducing sound films, in which the length of said slit and the width of the frontal area of the pointed end of the hollow body in the lengthwise direction of the slit are substantially equal to the width of the sound track to be recorded or reproduced by said device.

3. Device according to claim 1 for recording or reproducing sound films, in which the length of said slit and the width of the frontal area of the pointed end of the hollow body in the lengthwise direction of the slit are substantially equal to the width of the sound track to be recorded or reproduced by said device, and the inner width of the pointed end of the hollow body next to the frontal area of said pointed end in the lengthwise direction of the slit is but slightly smaller than the outer width of said frontal area in the same direction.

4. A slit forming device for recording or reproducing photographic records comprising a hollow body of rotation having one of its ends conically pointed, said body having a slit in the frontal area of the pointed end thereof, and a squeezing ring having a conical internal surface enclosing and exerting inward pressure on the sides of the pointed end of said body.

DÉNES von MIHÁLY.